(12) United States Patent
Jackman et al.

(10) Patent No.: US 6,618,526 B2
(45) Date of Patent: Sep. 9, 2003

(54) FIBER OPTIC CABLES

(75) Inventors: William S. Jackman, Hickory, NC (US); Louis A. Barrett, Conover, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/965,695

(22) Filed: Sep. 27, 2001

(65) Prior Publication Data

US 2003/0059181 A1 Mar. 27, 2003

(51) Int. Cl.[7] .................................................. G02B 6/44
(52) U.S. Cl. ..................... 385/102; 385/100; 385/101; 385/103; 385/113; 385/114; 385/108
(58) Field of Search .................................. 385/101–115

(56) References Cited

U.S. PATENT DOCUMENTS

| | | | |
|---|---|---|---|
| 4,089,585 A | 5/1978 | Slaughter et al. | 350/96.23 |
| 4,184,860 A | 1/1980 | Schneider et al. | 65/3 A |
| 4,213,672 A | 7/1980 | Aulich et al. | 350/96.23 |
| 4,311,726 A | 1/1982 | Hacker et al. | 427/54.1 |
| 4,354,732 A | 10/1982 | Arnaud et al. | 350/96.23 |
| 4,422,889 A | 12/1983 | Trezeguet et al. | 156/70 |
| 4,467,138 A | 8/1984 | Brorein | 174/115 |
| 4,487,997 A | 12/1984 | Ditchfield | 174/115 |
| 4,504,112 A | 3/1985 | Gould et al. | 350/96.23 |
| 4,660,928 A | 4/1987 | Jaeger et al. | 350/96.33 |
| 4,729,628 A | 3/1988 | Kraft et al. | 350/96.23 |
| 4,786,138 A | 11/1988 | Buckley | 350/96.23 |
| 4,822,133 A | 4/1989 | Peacock | 350/96.23 |
| 4,830,459 A | 5/1989 | Chicken et al. | 350/96.23 |
| 4,875,758 A | 10/1989 | Masuda et al. | 350/96.3 |
| 4,911,525 A | 3/1990 | Hicks et al. | 350/96.23 |
| 5,044,722 A * | 9/1991 | Voser | 385/113 |
| 5,082,380 A | 1/1992 | Sutehall et al. | 385/114 |
| 5,155,304 A | 10/1992 | Gossett et al. | 174/117 |
| 5,369,720 A | 11/1994 | Parry et al. | 385/114 |
| 5,577,147 A * | 11/1996 | Arroyo et al. | 385/109 |
| 5,611,017 A | 3/1997 | Lee et al. | 385/114 |
| 5,615,293 A * | 3/1997 | Sayegh | 385/102 |
| 5,621,842 A | 4/1997 | Keller | 385/114 |
| 5,649,043 A * | 7/1997 | Adams et al. | 385/110 |
| 5,737,470 A | 4/1998 | Nagano et al. | 385/114 |
| 5,787,217 A * | 7/1998 | Traut et al. | 385/106 |
| 5,822,484 A * | 10/1998 | Arroyo | 385/101 |
| 5,857,051 A * | 1/1999 | Travieso et al. | 385/114 |
| 6,295,401 B1 * | 9/2001 | Rutterman et al. | 385/114 |

OTHER PUBLICATIONS

"Standard Handbook for Electrical Engineers" Eleventh Edition section 14: Subsections 64–78.
"Corning SMF–28 optical Fiber Product Information" Apr. 2001.

* cited by examiner

Primary Examiner—Brian Healy
Assistant Examiner—Kevin S. Wood
(74) Attorney, Agent, or Firm—Michael E. Carroll, Jr.

(57) ABSTRACT

A fiber optic cable having at least two interfaces being formed by first and second members. Between the interfaces is at least one retention area having an optical fiber component disposed therein. The retention area is disposed generally longitudinally and non-helically relative to an axis of the cable. The cable may also include a cable jacket substantially surrounding the members, a cushioning zone adjacent the optical fiber component, a water-blocking component and/or an interfacial layer. In another embodiment, a fiber optic cable includes a strength group having at least one strength member and an optical fiber being proof-tested to 125 KPSI or greater.

48 Claims, 4 Drawing Sheets

FIBER OPTIC CABLES

FIELD OF THE INVENTION

The present invention relates generally to fiber optic cables.

BACKGROUND OF THE INVENTION

Fiber optic cables include optical fibers that are capable of transmitting voice, video, and data signals. Fiber optic cables have advantages over electrical voice, video and data signal carriers, for example, increased data capacity. As businesses and households demand increased data capacity, fiber optic cables can eventually displace electrical voice, video, and data signal carriers. This demand will require low fiber count optical cables suitable for routing to end users, for example, businesses and households.

Fiber optic cables may be used in various applications. For example, fiber optic cables may be suitable for both aerial and buried cable applications. More specifically, a fiber optic cable may approach the end user either aerially, buried, or a combination of both. Aerial and buried cable environments have some different requirements and considerations. Optical fiber cables should meet the unique requirements and considerations of intended environments, yet still remain cost effective.

SUMMARY OF THE INVENTION

The present invention is directed to a fiber optic cable including a first strength member, a second strength member, and at least one optical fiber component. The first strength member and the second strength member form at least two interfaces having least one retention area disposed between the at least two interfaces. The retention area is disposed generally longitudinally and non-helically relative to an axis of the cable with at least one optical fiber component disposed within the at least one retention area.

The present invention is also directed to a fiber optic cable including a first member having at least one planar surface, a second member having at least one planar surface, and at least one optical fiber component. The first member and the second member form at least two interfaces, at least one of the two interfaces being formed between the at least one planar surface of the first member and the at least one planar surface of the second member. At least one retention area is disposed between the at least two interfaces, the retention area is disposed generally longitudinally and non-helically relative to an axis of the cable. The at least one optical fiber component is disposed within the at least one retention area and a cable jacket generally surrounds the first and second members.

The present invention is further directed to a fiber optic cable including a strength group having at least one strength member, at least one optical fiber component, and at least one optical fiber component being proof-tested to at least about 125 KPSI.

DETAILED DESCRIPTION OF THE INVENTIONS

Figure 1:
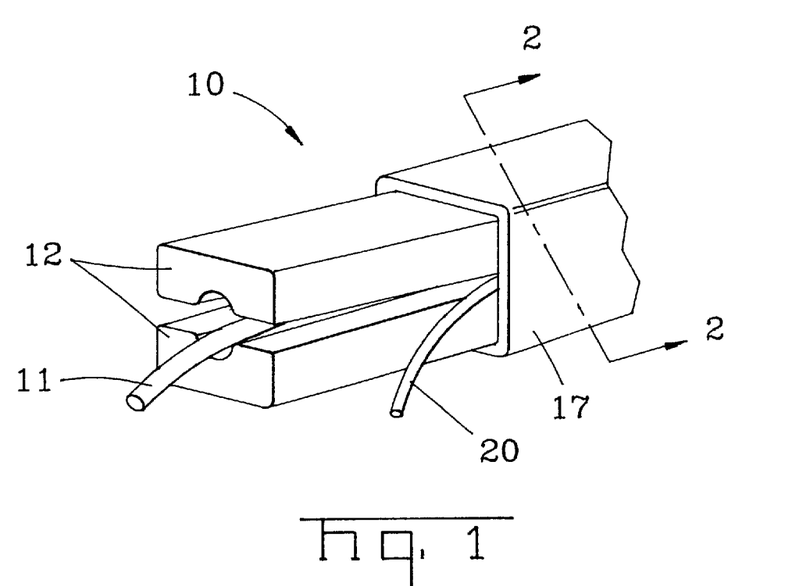
FIG. 1 is an isometric view of an exemplary embodiment of the present invention.
Figure 2:
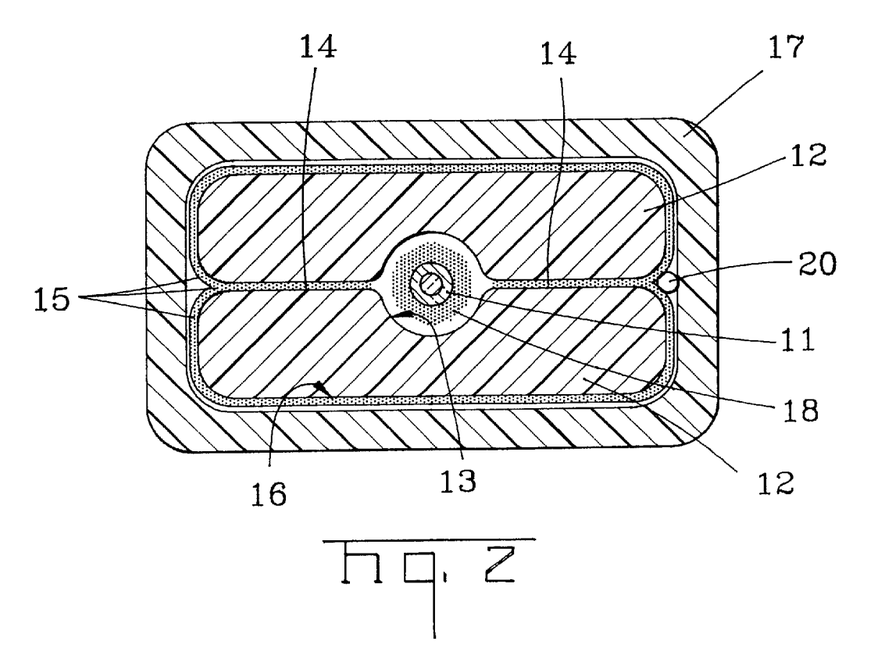
FIG. 2 is a cross-sectional view of the fiber optic cable of FIG. 1 taken at line 2-2.
Figures 4, 4A, 5:
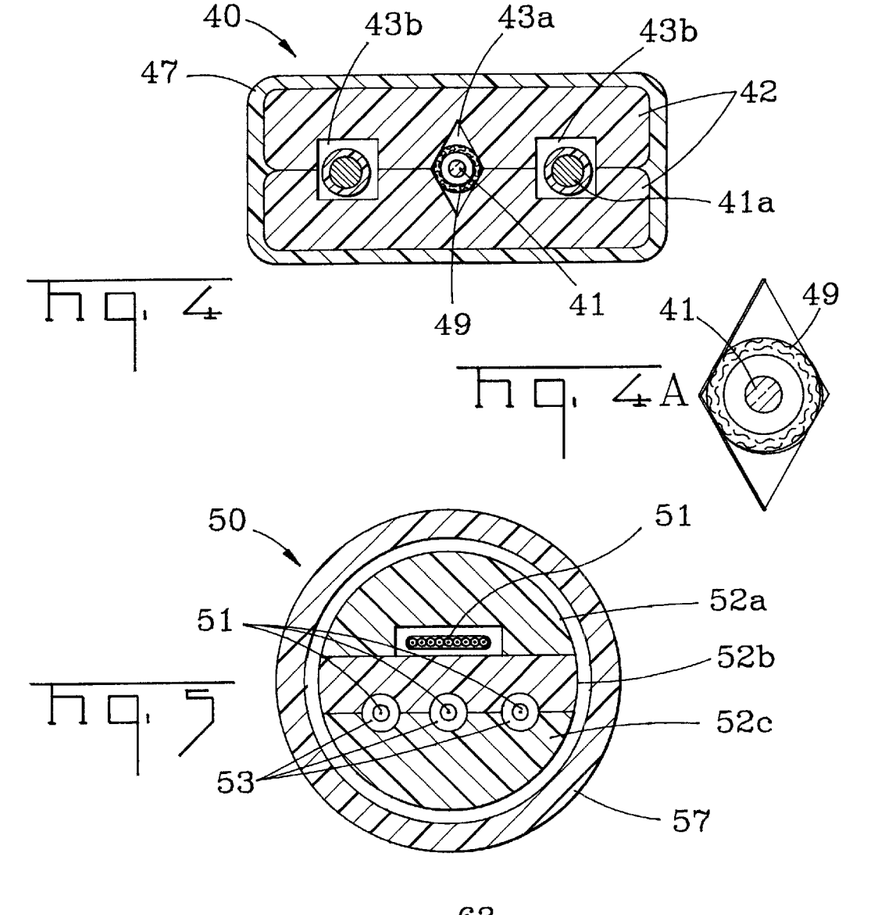
FIG. 4 is a cross-sectional view of a fiber optic cable in accordance with another embodiment of the present invention.
FIG. 4a is an enlarged view of a portion of FIG. 4.
FIG. 5 is a cross-sectional view of a fiber optic cable in accordance with another embodiment of the present invention.

A fiber optic cable 10 according to an embodiment of the present invention is depicted in FIGS. 1 and 2. Fiber optic cable 10 includes at least two interfaces 14 being formed by a first and a second member 12, between interfaces 14 is at least one retention area 13 that can include an optical fiber component 11 disposed therein. A cable jacket 17 may substantially surround members 12 and optical fiber component 11. A cushioning zone 18 may be disposed adjacent to the optical fiber component, and/or a water-blocking component 49 may be enclosed by the cable jacket as shown in FIG. 4.

In one embodiment, optical fiber component 11 comprises at least one loose optical fiber. However, component 11 may be colored or tight buffered, contained in a buffer tube, bundled or ribbonized in a common matrix, a stack of ribbons, combinations thereof, or other suitable light waveguides. Each optical fiber may include a silica-based core that is operative to transmit light and is surrounded by a silica-based cladding having a lower index of refraction than the core. Additionally, one or more coatings may be applied to the optical fiber. For example, a soft primary coating surrounds the cladding, and a relatively rigid secondary coating surrounds the primary coating. Each optical fiber component can be, for example, a single-mode or multi-mode optical fiber available commercially from Corning Inc. of Corning, N.Y.

The present inventors have discovered that using high-proof tested optical fiber component(s) 11 allows optical cables to have a higher reliability with spans of longer distances, higher tensile loads and/or relatively smaller tensile ratings compared with fiber optic cables using relatively low proof-tested optical fiber component (s). For example, reliability may be improved by reducing the risk of optical fiber breakage. Optical fiber components 11, for example, SMF-28 optical fibers available from Corning, Inc. are proof-tested to 100 KPSI. One embodiment of the present invention includes optical cables having optical fibers that are proof-tested to greater than 100 KPSI, preferably proof-tested to about 125 KPSI, more preferably, to about 150 KPSI or more, and most preferably to about 200 KPSI or more.

In general, the tension of an aerial fiber optic cable is related to the span of the fiber optic cable. In order to maintain the same amount of cable sag as the span of the fiber optic cable increases, the tension the fiber optic cable experiences must also increase. More particularly, when attachment points of the aerial fiber optic cable have the same elevation, the tension of the fiber optic cable may be approximated by the parabola equation:

$$t = \frac{ws^2}{8d}$$

where:
- t=horizontal component of tension
- w=normalized weight of the cable
- s=span (horizontal distance between adjacent attachment points)
- d=sag (largest vertical distance between the cable and straight line between attachment points).

The parabola equation approximates the horizontal component of the tension on a fiber optic cable, which is a relatively good approximation for the tension in the fiber optic cable. In particular, the parabolic equation shows that the tension of the fiber optic cable is approximately proportional to the square of the span length. Additionally, fiber optic cables experience environmental loads not accounted for in the parabolic equation that increase fiber optic cable tension. Fiber optic cablers generally require that fiber optic cables maintain suitable levels of optical performance at predetermined environmental loading conditions, such as, ice and/or wind loads.

There are at least two methods of handling the increased tension associated with increasing the span lengths. The at least two methods are allowing more cable strain and/or increasing the tensile strength/rating of the cable. There are design considerations associated with each of these methods of increasing span lengths in fiber optic cables. First, increasing fiber optic cable strain is generally associated with increasing optical fiber strain. In fiber optic cables, increasing fiber optic strain may cause undesirable optical attenuation. Moreover, increasing optical fiber strain increases the probability of stress related optical fiber breaks. Second, increasing the tensile strength/rating of a fiber optic cable may generally increase the weight, cost, and/or diameter of the fiber optic cable. Increasing the weight and diameter of the fiber optic cable causes an increase in both the initial tension required during installation of the fiber optic cable and tension experienced during environmental loading conditions.

Figure 3:
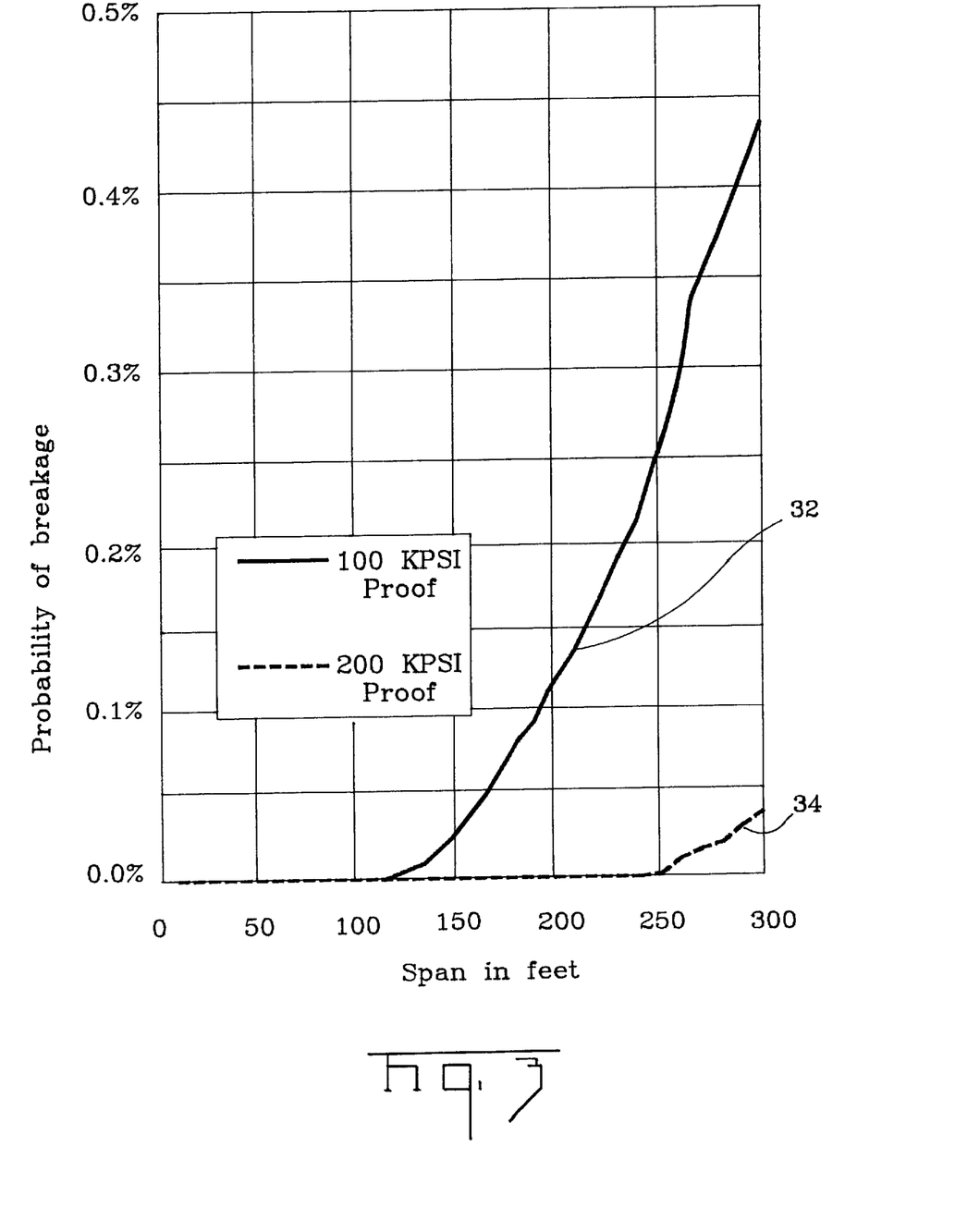
FIG. 3 illustrates a representative graph indicating comparative data regarding the probability of optical fiber breakage of a 100 KPSI proof-tested optical fiber versus a 200 KPSI proof-tested optical fiber according to the present invention in an exemplary cable.

FIG. 3 is a graph illustrating the span of an exemplary optical fiber drop cable design, which has no excess fiber length, versus the probability of an optical fiber of the drop cable breaking under National Electric Safety Code (NESC) heavy loading conditions during the life of the cable. Curve 32 depicts a 100 KPSI proof-tested optical fiber in the exemplary optical drop cable design. As shown, at a span of about 125 feet, curve 32 increases its probability of breakage from about zero as the span distance is increased. The slope of curve 32 is also relatively steep.

Curve 34 depicts a 200 KPSI proof-tested optical fiber in the same optical drop cable design as in curve 32. The present inventors have discovered that using a higher proof-tested optical fiber allows increased aerial spans with improved reliability in fiber optic cables. In particular, at a span of 250 feet curve 34 increases its probability of breakage from about zero as the span distance is increased, but with a much shallower slope than curve 32. Thus, using the same optical drop cable design, having no excess fiber length, a 200 KPSI proof-tested optical fiber would be able to span twice the distance as a 100 KPSI optical fiber cable before there was a probability of breaking the optical fiber.

Additionally, optical cables having high-proof optical fiber component(s) 11 may also be designed with smaller tensile ratings, more particularly, smaller EA values than cables having relatively low-proof optical fiber component(s) 11. The EA value describes a tensile strength of the cable defined by the strength member(s) material modulus and cross-sectional area. More particularly, given a predetermined tensile load and an allowable amount of strain an EA value can be calculated by the following relationship:

where:

$$EA = P\epsilon$$

- E=material modulus of elasticity
- A=cross-sectional area of strength member(s)
- P=tensile load
- $\epsilon$=percent of strain According to the present invention, after an EA value is calculated, material(s) may be chosen and the cross-sectional requirements of that material may be calculated to meet the design requirements of a cable having high-proof optical fiber(s). High-proof optical fibers of the present invention may withstand higher fiber strains than relatively low-proof optical fibers before encountering performance and/or reliability issues.

For example, a 200 KPSI optical fiber may be able to withstand a fiber strain of about 1.5% or more. More preferably, a 200 KPSI optical fiber should have a fiber stain of about 1.2% or less, most preferably, a fiber strain of about 0.6% or less.

In accordance with the present invention, maximum EA values can be calculated by taking the product of a predetermined maximum tension load 'P' times a predetermined maximum fiber stain. Illustratively, a optical drop cable with a 200 KPSI proof optical fiber having a maximum tensile load of about 1000 lbs. and a maximum allowable fiber strain of 1.5% yields a maximum EA value of about 1500 lbs., the same load with a maximum allowable fiber stain of 1.2% yields an EA value of about 1200 lbs., and the same load with a maximum allowable fiber strain of 0.6% yields an EA value of about 600 lbs. Likewise, maximum EA values may be determined with other suitable high-proof optical fibers, maximum tensile loads and/or maximum strains. Thus, a strength group of strength members, which includes at least one strength member, in a fiber optic cable may be designed having the aforementioned calculated EA values.

High-proof optical fiber components of the present invention may be used in drop cable designs other than the embodiments disclosed herein. For example, high proof optical fiber component(s) may, for example, be used in drop cable designs such as U.S. Pat. No. 4,729,628, U.S. application Ser. Nos. 09/344,151, 09/822,523, 09/822,528, 09/822,529 or 09/861,831, which are incorporated herein by reference. Moreover, high-proof optical fiber components may used in other suitable fiber optic and/or composite cables.

Cables of the present invention may include cushioning zone 18, which preferably preserves optical performance within desirable ranges. Cushioning zone 18 is preferably operable to decouple optical fiber component 11 from members 12. Cushioning zone 18 can be generally interposed between members 12 and optical fiber component 11, for the purpose of decoupling optical fiber component 11 from members 12. Decoupling permits relative movement between the optical fiber component 11 and members 12 during, for example, thermal variations or cable bending. Moreover, cushioning zone 18 can substantially surround optical fiber component 11. If employed, cushioning zone 18 can include grease, but may include other materials such as aramid fibers, gels, foams, thermoplastic filling compounds, such as disclosed in U.S. application Ser. No. 09/322,625, water-blocking compounds such as tapes, yarns and/or powders.

Embodiments may also include an interfacial layer 15 at least partially disposed between members 12 and/or between an outer surface 16 of members 12 and cable jacket 17. If employed, interfacial layer 15 may include a coating having corrosion protection, for example, copper cladding, but may include: a water-swellable material; a material to promote adhesion between members 12 and/or cable jacket 17, such as, ethylene acrylic acetate; primer, plastic, tape, zinc, other corrosion protective materials; and/or a predetermined surface roughness for adhesion purposes.

Water-blocking component 49, as depicted in FIGS. 4 and 4a, may be disposed in at least one retention area formed by members 42, disposed between the members, and/or disposed between the members and the cable jacket. For example, the water-blocking component may also be a yarn helically wrapped around members 12 also functioning to hold members 12 together or a tape at least partially surrounding a portion of members 12. Water-blocking components generally include water-swellable particles that swell upon exposure to water so as to form a blockage in the cable for inhibiting the further migration of water in the cable. Generally, the water-swellable particles are formed of a superabsorbent polymer on or in a medium, for example, a yarn or tape. Preferred superabsorbent polymers are partially cross-linked polymers that absorb many times their own weight in water and swell considerably without dissolving, for example, acrylate, urethane or cellulosic based materials. Water-blocking components may also serve other functions. For example, the water-blocking component may also function as a ripcord for removing portions of cable jacket 17.

Cable jacket 17 generally provides environmental protection and generally surrounds optical fiber component 11 and members 12. However, suitable embodiments of the present invention may be practiced without jacket 17 if they provide environmental protection to optical fiber component 11. Cable jacket 17 may be formed of polyethylene or flame-retardant plastics, such as PVC or flame retardant polyethylene, however other suitable materials may be used. A tube-on or pressure extrusion process may be used to apply cable jacket 17 to a thickness of about one-millimeter, however other suitable dimensions may be used. The shape of cable jacket 17 generally conforms to the shape of members 12. Cable jacket 17 may also include notches in jacket 17 to facilitate removable of cable jacket 17. A ripcord 20 that may be disposed generally along the longitudinal axis of the cable may also facilitate removal of jacket.

Figure 7:
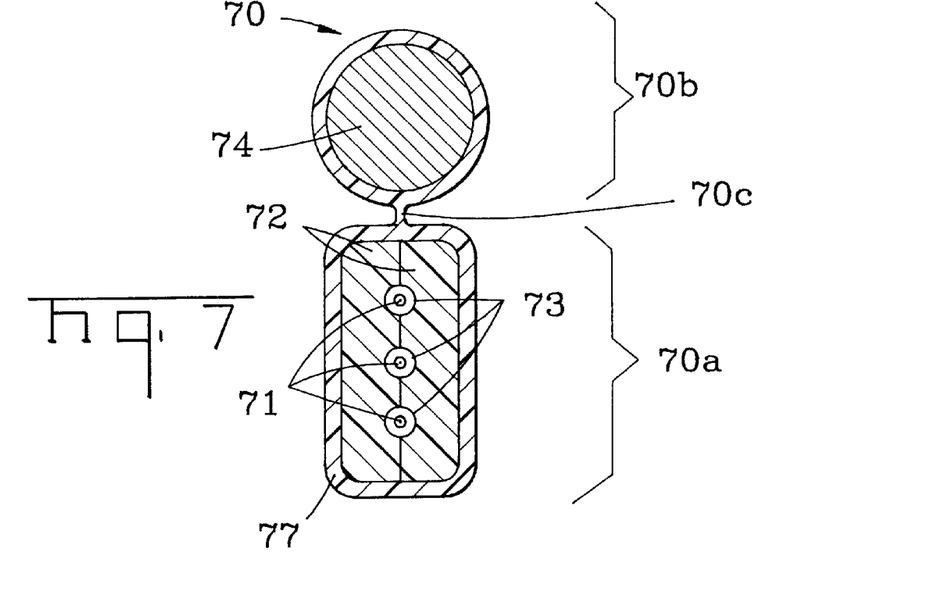
FIG. 7 is a cross-sectional view of a fiber optic cable in accordance with another embodiment of the present invention.
Figure 8:
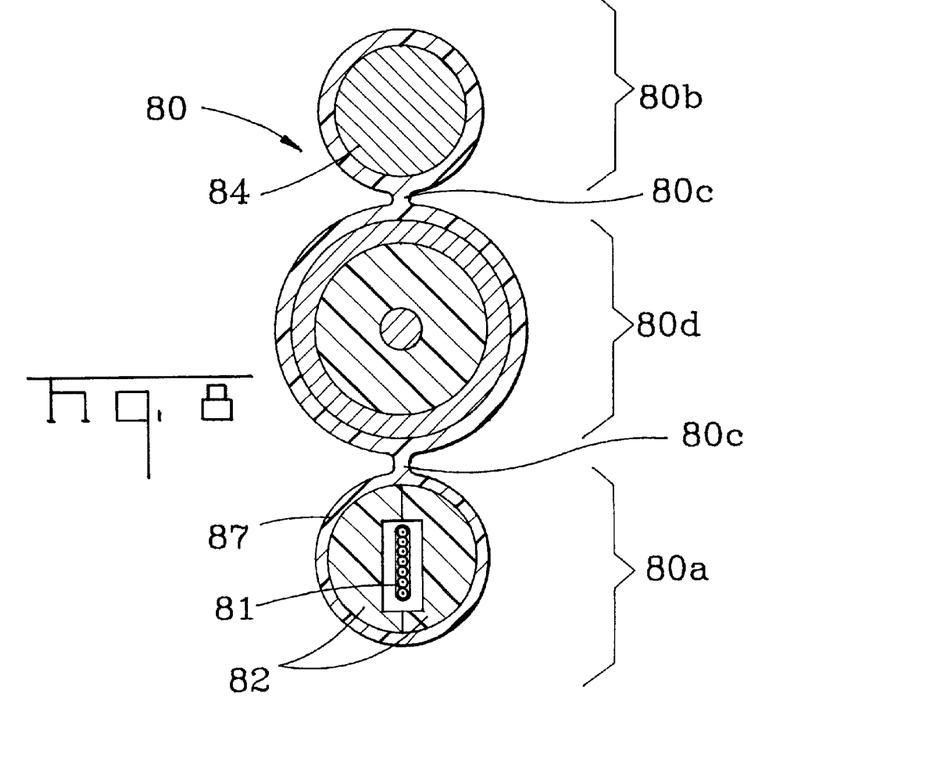
FIG. 8 is a cross-sectional view of a fiber optic cable in accordance with another embodiment of the present invention.

Member(s) 12 may be a high strength material intended to carry a tensile load applied to the cable, e.g., a strength member such as a glass-reinforced plastic, however, member(s) 12 may be a thermoplastic not intended to carry a tensile load applied to the cable, e.g., FIGS. 7 and 8. A strength member is an element of the fiber optic cable having a relatively high tensile modulus intended to carry a substantial fraction of the tensile load applied to the cable, for example, about 3% percent or more. In one embodiment, the two members having about the same tensile rating and are intended to each carry about the same tensile load and form a strength group, however other embodiments may vary the tensile ratings, intending the members of the strength group to carry different tensile loads. Additionally, members 12 may be manufactured from other suitable dielectrics, semi-conductive materials, metallic materials, or combinations thereof. Such materials include, for example, aluminum, carbon fiber, copper, composite metals, plastics, or steel. Embodiments of cables according to the present invention can be mechanically robust, for example, members 12 may be formed from a high strength material that can withstand a predetermined tensile load, up to about 1000 lbs. or more. Additionally, cable 10 can include a minimum bend radius of about 10 centimeters or less and a maximum span of about two-hundred feet or more. Moreover, at the predetermined tensile load members 12 and/or cable 10 should have a strain in the range of essentially about 0% to about 1.5%, more preferably between essentially about 0% and about 1.2% and most preferably between essentially about 0% and about 0.6% depending on factors such as the proof-test strength of optical fiber component 11 and/or excess fiber length. Excess fiber length in cable 10 generally allows the cable to experience strain before the optical fiber experiences strain. Excess fiber length in cable 10 can be accomplished, for example, by placing optical fiber component 11 between stressed members 12 during the manufacturing process.

Retention area 13 may receive optical fiber component 11, but may receive a coaxial cable, a twisted pair or other suitable electrical conductors. Retention area 13 can be a concave recess formed adjacent to at least one interface 14, but may include other suitable shapes, for example, rectangular. Additionally, retention area 13 may be disposed on one or more members and may be symmetrical as illustrated in members 12 in FIG. 2 or non-symmetrical as illustrated in members 52a, 52b forming the upper retention area of FIG. 5. In general, retention area 13 is generally longitudinally disposed substantially parallel to the cable axis. Preferably, retention areas according to the present invention are non-helical and generally longitudinally disposed to an axis of the cable. Retention area 13 preferably does not include sharp corners and/or edges, but may include a coating, for example, a thermoplastic layer, forming a smooth surface. Moreover, in one embodiment retention area 13 includes a partial air gap between optical fiber component 11 and a coating on a portion of the surface of retention area 13.

The shape and size of member 12 can control the size and shape of retention area 13. As illustrated in FIG. 2, generally convex retention area 13 of one embodiment is sized to receive a 250 micron optical fiber component. By way of example, members 12 can be generally flat glass reinforced plastic members each having a height of about 1 mm and width of about 4 mm.

Additionally, members 12 are preferably selected based on such considerations as crush ratings, temperature range, strain and/or stress loads. In another embodiment, optical fiber component 11 will be located at about or as close as possible to a neutral bending axis of the cable for avoiding undue stress on the optical fiber component. In other words, optical fiber component 11 is located generally on a transverse plane, generally perpendicular to the cross-section, that generally experiences about zero stress, or as close as possible to zero stress, when the fiber optic cable is installed. The generally rectangular shape and size of cable 10 may also be selected for use with P-clamps or the size and shape of cables of the present invention may be selected for use with other suitable clamps.

In other aspects of the present inventive concepts, the size, shape and/or pattern of members 12 may advantageously control the location of the neutral axis of the cable. Moreover, by taking into account the size, shape and/or pattern of members 12 the bending preference of cable 10 may be manipulated. The cable can generally have no bending preference if the bending moments of inertia along X and Y coordinate orthogonal axes are about roughly equal. The cable can have a preferential bend characteristic if one of the bending moments of inertia is about two to five times greater than the other orthogonal axis. Additionally, the cable can also have a high preferential bend characteristic if one of the bending moments of inertia is about five times or more than the orthogonal axis.

Figure 6:
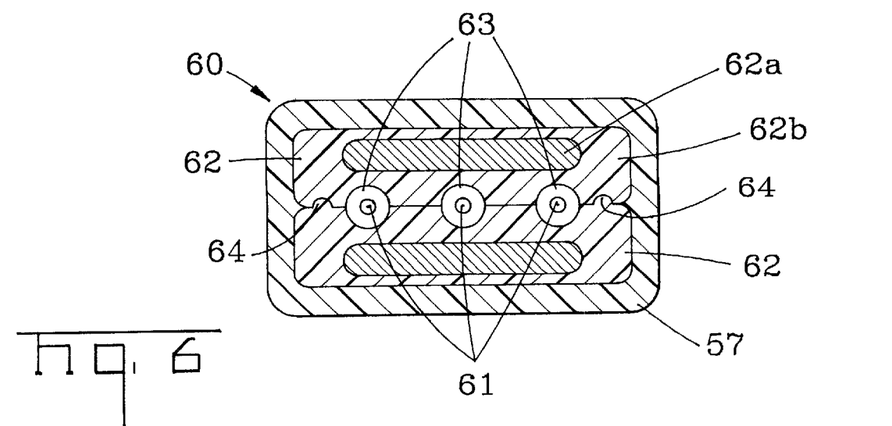
FIG. 6 is a cross-sectional view of a fiber optic cable in accordance with another embodiment of the present invention.

Members 12 may be in contact forming interfaces 14. However, members 12 may be separated by a generally short distance while still forming an interface, for example, members 12 may have a water-swellable tape or an adhesive therebetween. Members 12 can be fixed, or removably fixed, to each other to prevent movement between, or among, members 12 during, for example, bending. Suitable fixing means include adhesives, cold-welding, crimping, interlocking means, for example, protrusions 64 on one member 62 as depicted in FIG. 6, welding and/or roll-forming.

Fiber optic cable 10 can have a range of major transverse measurements, for example, about 1 millimeter to about 15 millimeters or more. Additionally, fiber optic cable 10 may have different shapes, for example, circular, rectangular, square or elliptical.

Fiber optic cable 10 is advantageous because, for example, it can be suitable for both aerial and buried cable environments, allows the craftsman to easily access the optical fiber by splitting members 12, it is reliable, and can be manufactured at low cost. A further advantage of cable 10 is that a craftsman knows where optical fiber components 11 are located and can easily access the same by running a cutting knife flat against members 12 without damaging optical fiber component(s) 11. However, fiber optic cable 10 can take other forms while still providing these same advantages.

Depicted in FIGS. 4 and 4a is fiber optic cable 40 another exemplary embodiment of the present invention. As described in conjunction with the embodiments of FIG. 1, fiber optic cable 40 includes a plurality of retention areas 43a, 43b formed by a plurality of members 42 generally surrounded by cable jacket 47. Depending on applications, e.g., aerial applications intended to carry a tensile load, members 42 may be at least partially formed from a high-strength material, however, meters 42 may also be adapted for other applications that do not require high-tensile strength. Retention areas 43a, 43b of members 42 can define various shapes and depths, for example, a diamond-shaped retention area is formed by members 42 in the center of cable 40. Moreover, members 42 may have different shaped retention areas, or none at all. For example, a first member may have a generally concave retention area and the second member may have a planar surface with no retention area. Optical fiber component 41 or electrical conductors 41a can be disposed within retention area 43a, 43b as illustrated, this embodiment includes an optical fiber and a water-blocking tape 49 in the center retention area 43a and electrical conductors in the outer retention areas 43b. Additionally, the embodiment in FIG. 4 may include, for example, an interfacial layer and/or a cushioning zone.

As described in conjunction with the embodiments of FIG. 2., fiber optic cable 50 of FIG. 5 includes a plurality of retention areas 53 formed by a plurality of members 52a, 52b, and 52c of different shapes that are generally surrounded by cable jacket 57. More particularly, member 52a includes a generally arcuate outer portion and a generally slot-shaped retention area 53. Member 52b has a generally flat shape with a plurality of round or concave shaped retention areas 53. Member 52c includes a generally round outer portion and a plurality of round or concave shaped retention areas 53. Retention areas 53 of members 52a, 52b, 52c can define various shapes, depths and/or be formed from generally distinct shaped areas as depicted in the upper retention area of cable 50. As illustrated, cable 50 includes a optical fiber ribbon and a plurality of individual optical fibers, however cable 50 may also include other suitable optical fiber components 51 or electrical conductors within retention areas. Additionally, the embodiment in FIG. 5 may include, for example, an interfacial layer, a cushioning zone, and/or a water-blocking component as described herein.

As described in conjunction with the embodiments of FIG. 1, exemplary fiber optic cable 60 of FIG. 6 includes a plurality of retention areas 63 formed by a plurality of composite members 62. Composite members 62 may include a metal core 62a, such as steel, with a dielectric outer portion 62b forming retention areas 63 of composite members 62 that can define various shapes and depths. Optical fiber components 61 or electrical conductors can be disposed within retention areas 63. Additionally, the embodiment in FIG. 6 may include, for example, an interfacial layer, a cushioning zone, and/or a water-blocking component as described herein.

Fiber optic cable 70 of FIG. 7 is an exemplary figure eight design having a carrier portion 70a and a messenger portion 70b enclosed in a common cable jacket 77. Carrier portion 70a of cable 70 is similar to fiber optic cable 10, however cable 70 differs from cable 10 because messenger portion 70b is designed to carry a tensile load. Messenger portion 70b may include a suitable strength element 74 for carrying the tensile load, for example, a steel wire. Carrier portion 70a includes retention areas 73 formed by a plurality of members 72. Members 72 are generally not intended to provide tensile strength to cable 70; however, members 72 may provide tensile strength if desired. For example, members 72 can be formed from a thermoplastic or thermoset material, however other suitable materials may be used. Additionally, carrier portion 70a may be connected to messenger portion 70b by a web portion 70c. Web portion 70c may be a continuous web portion or intermittent webs allowing for an overlength of the carrier portion 70a. The overlength of carrier portion 70a may be about 0.2% to about 2.0% or more compared with the length of messenger portion 70b allowing messenger portion 70b to experience strain before inducing a tensile load in carrier portion 70a. Cable 70 also includes an optical fiber component 71, however cable 70 may also include other suitable electrical conductors.

FIG. 8 illustrates exemplary fiber optic cable 80, which is similar to cable 70, but includes an electrical conductor 80d between messenger portion 80b and carrier portion 80a, for example, a coaxial cable attached to portions 80a and 80b by webs 80c formed by a common cable jacket 87. Messenger portion 80b includes strength element 84. This embodiment illustrates an optical ribbon 81 disposed within retention area 83 of members 82, however other suitable light waveguides may be used. Additionally, the embodiments depicted in FIGS. 7 and 8 may include, for example, an interfacial layer, a cushioning zone, and/or a water-blocking component as described herein.

In view of the present disclosure, many modifications and other embodiments of the present invention, within the scope of the appended claims, will become apparent to a skilled artisan. For example, a plurality of dissimilar shaped members can be incorporated with or without non-planar interfaces, optical fiber components can be disposed in a buffer tube with or without a cushioning zone, or elements of the present invention may be used in breakout cables. Therefore, it is to be understood that the present inventions are not to be limited to the specific embodiments disclosed herein and that modifications and other embodiments are intended to be included within the scope of the appended claims. Although specific terms are employed herein, they are used in a generic and descriptive sense only and not for purposes of limitation. The invention has been described with reference to low fiber count drop cable designs but the inventive concepts of the present invention are applicable to other cable types as well.

That which is claimed:

1. A fiber optic cable, comprising:
   a first strength member;
   a second strength member;
   at least one optical fiber component;
   said first strength member and said second strength member forming at least two interfaces with each other;
   at least one retention area disposed between said at least two interfaces, said retention area disposed generally longitudinally and nonhelically relative to an axis of the cable; and
   said at least one optical fiber component disposed within said at least one retention area.

2. The fiber optic cable according to claim 1, said at least one optical fiber component being proof-tested to about 125 KPSI or more.

3. The fiber optic cable according to claim 2, said strength members having a combined EA value of about 1500 lbs. or less.

4. The fiber optic cable according to claim 2, said strength members having a combined EA value of about 1200 lbs. or less.

5. The fiber optic cable according to claim 1, said at least one optical fiber component being proof-tested to about 150 KPSI or more.

6. The fiber optic cable according to claim 5, said strength members having a combined EA value of about 1500 lbs. or less.

7. The fiber optic cable according to claim 5, said strength members having a combined EA value of about 1200 lbs. or less.

8. The fiber optic cable according to claim 1, said at least one retention area including a portion having a generally concave shape.

9. The fiber optic cable according to claim 1, one of said strength members having a generally non-circular cross-section.

10. The fiber optic cable according to claim 1, one of said strength members having a generally arcuate portion.

11. The fiber optic cable according to claim 1, one of said strength members comprising a generally flat shape.

12. The fiber optic cable according to claim 1, said first and said second strength members having about the same tensile strength ratings.

13. The fiber optic cable according to claim 1, said first and said second having different tensile strength ratings.

14. The fiber optic cable according to claim 1, one of said strength members includes a material selected from the following: a dielectric, a metal, a semiconductor, or a combination thereof.

15. The fiber optic cable according to claim 1, said at least one optical fiber component being adjacent to a cushioning zone.

16. The fiber optic cable according to claim 15, said cushioning zone substantially surrounding the at least one optical fiber component.

17. The fiber optic cable according to claim 1, further including a water-blocking component.

18. The fiber optic cable according to claim 1, a cross-sectional area of the cable being non-circular.

19. The fiber optic cable according to claim 1, said first and least one retention area being formed by at least two generally distinct shaped areas.

20. The fiber optic cable according to claim 1, said cable having a non-preferential bend characteristic.

21. The fiber optic cable according to claim 1, said cable having a preferential bend characteristic.

22. The fiber optic cable according to claim 1, further comprising a cable jacket generally surrounding said strength members.

23. The fiber optic cable according to claim 22, further comprising an interfacial layer at least partially disposed within said cable jacket.

24. A fiber optic cable, comprising:
   a first member having at least one planar surface;
   a second member having at least one planar surface;
   at least one optical fiber component;
   said first member and said second member forming at least two interfaces with each other, at least one of said two interfaces being formed between said at least one planar surface of said first member and said an least one planar surface of said second member;
   at least one retention area disposed between said at least two interfaces, said retention area disposed generally longitudinally and non-helically relative to an axis of the cable;
   said at least one optical fiber component disposed within said at least one retention area; and
   a cable jacket generally surrounding said first and second members.

25. The fiber optic cable according to claim 24, said at least one optical fiber component being proof-tested to about 125 KPSI or greater.

26. The fiber optic cable according to claim 25, said members having a combined EA value of about 1500 lbs. or less.

27. The fiber optic cable according to claim 24, said at least one optical fiber component being proof-tested to about 200 KPSI.

28. The fiber optic cable according to claim 27, said members having a combined EA value of about 1500 lbs. or less.

29. The fiber optic cable according to claim 24, said cable further comprising a messenger section.

30. The fiber optic cable according to claim 24, said cable further comprising an electrical conductor.

31. The fiber optic cable according to claim 24, one of said members includes a material selected from the following:
   a dielectric, a metal, a semiconductor, or a combination thereof.

32. The fiber optic cable according to claim 24, said at least one optical fiber component being adjacent to a cushioning zone.

33. The fiber optic cable according to claim 32, said cushioning zone substantially surrounding the at least one optical fiber component.

34. The fiber optic cable according to claim 24, further including a water-blocking component.

35. The fiber optic cable according to claim 24, a cross-sectional area of the cable being non-circular.

36. The fiber optic cable according to claim 24, said cable having a non-preferential bend characteristic.

37. The fiber optic cable according to claim 24, said cable having a preferential bend characteristic.

38. A fiber optic cable, comprising:
   a strength group having at least one strength member;
   at least one optical fiber component; and
   said at least one optical fiber component being proof-tested to at least about 125 KPSI.

39. The fiber optic cable according to claim 38, said at least one optical fiber component being proof-tested to at least about 150 KPSI.

40. The fiber optic cable according to claim 38, said strength group having an EA value of about 1500 lbs. or less.

41. The fiber optic cable according to claim 38, said at least one optical fiber component being proof-tested to about 200 KPSI.

42. The fiber optic cable according to claim 41, said strength group having an EA value of about 1500 lbs. or less.

43. The fiber optic cable according to claim 38, said at least one optical fiber component being adjacent to a cushioning zone.

44. The fiber optic cable according to claim 43, said cushioning zone substantially surrounding said at least one optical fiber component.

45. The fiber optic cable according to claim 38, further comprising a water-blocking component.

46. The fiber optic cable according to claim 38, said cable having a non-preferential bend characteristic.

47. The fiber optic cable according to claim 38, said cable having a preferential bend characteristic.

48. The fiber optic cable according to claim 38, said cable further comprising a jacket generally surrounding said strength group and said at least one optical fiber component.

* * * * *